July 4, 1933.                H. E. WARREN                1,917,173
                              ELECTRIC MOTOR
                         Filed Oct. 19, 1931              2 Sheets-Sheet 1

Inventor:
Henry E. Warren,
by Charles E. Tullar
His Attorney.

July 4, 1933.  H. E. WARREN  1,917,173
ELECTRIC MOTOR
Filed Oct. 19, 1931  2 Sheets-Sheet 2
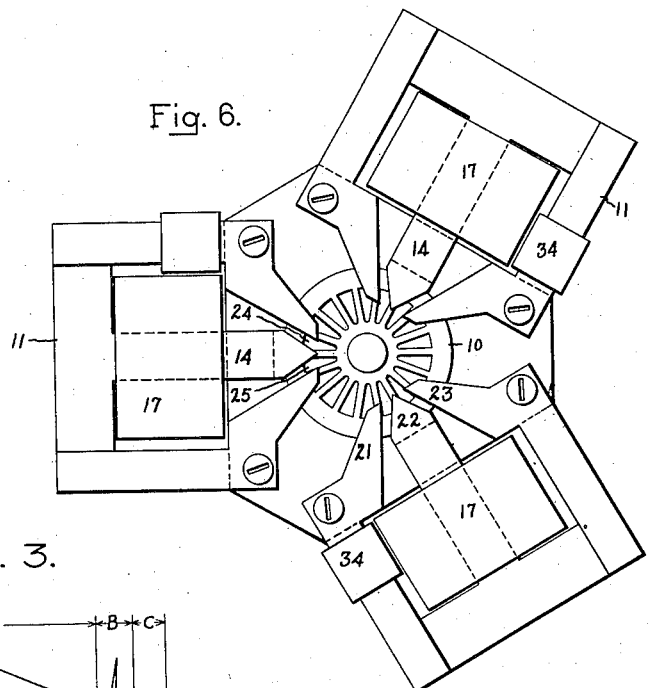
Fig. 6.
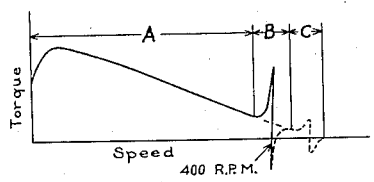
Fig. 3.
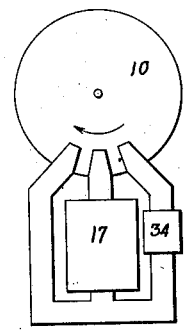
Fig. 8.
Fig. 7.
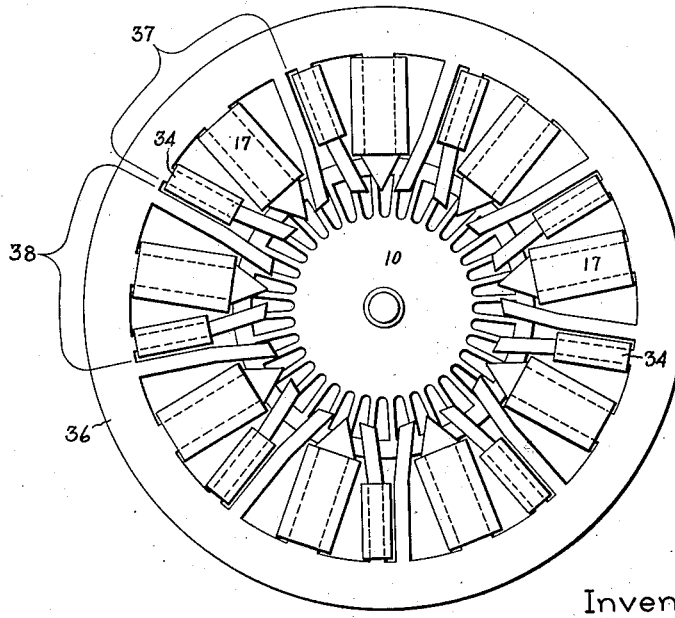
Inventor:
Henry E. Warren,
by Charles E. Tullar.
His Attorney.

Patented July 4, 1933

1,917,173

UNITED STATES PATENT OFFICE

HENRY E. WARREN, OF ASHLAND, MASSACHUSETTS, ASSIGNOR TO WARREN TELECHRON COMPANY, OF ASHLAND, MASSACHUSETTS, A CORPORATION OF MAINE

ELECTRIC MOTOR

Application filed October 19, 1931. Serial No. 569,608.

My invention relates to electric motors, and its primary object is to provide a reliable and low cost motor of simple, rugged construction and small dimensions particularly adapted for the driving of timing devices, clocks, signaling devices, time switches, etc. The motor is of the alternating current type, has a flux lagging coil or coils when designed to be self-starting, and is preferably provided with a rotor of the hysteresis type designed to be self-starting and synchronous in its operation, but may be designed without salient poles if synchronous operation is not desired.

In carrying my invention into effect, I provide a stator of very simple construction and with a relatively small air gap, capable of producing concentrated fluxes of high intensity and of the proper phase relation in the periphery of the rotor. The stator may take the form of a three-legged E shaped core with a single phase coil on its middle leg and a shading coil on one of the outer legs. At one end of the core the legs are separated by air gaps, across which out-of-phase fluxes are produced, and the rotor is arranged with its periphery adjacent these air gaps so as to be properly influenced by the fluxes to produce torque.

Figure 1:
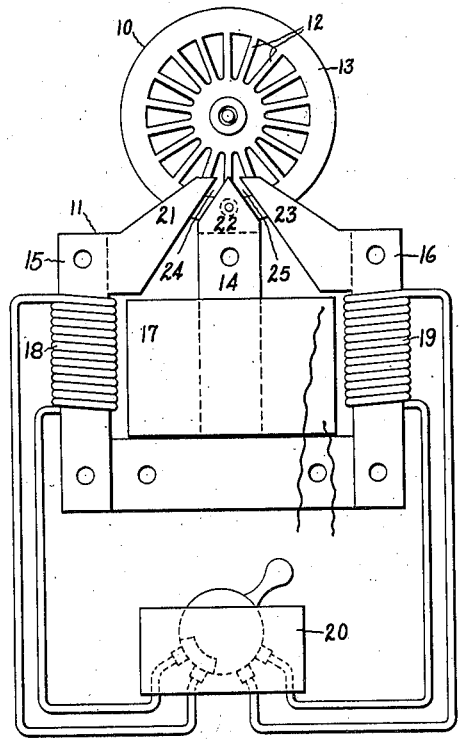
Figure 2:
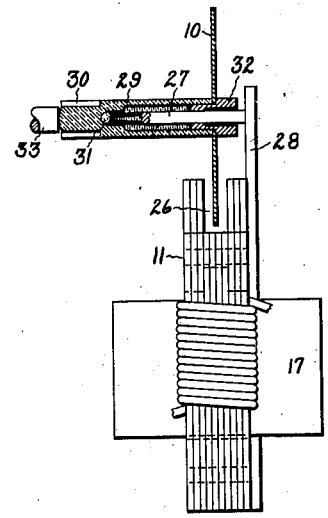
Figure 4:
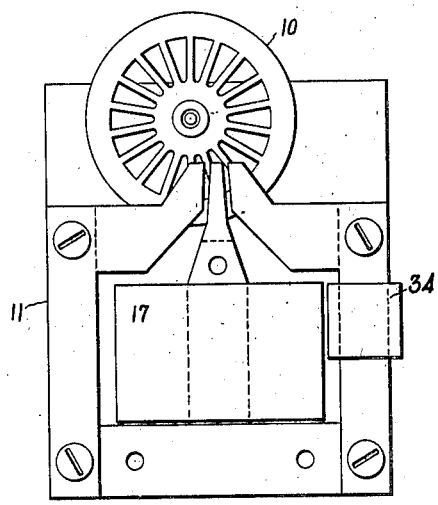
Figure 5:
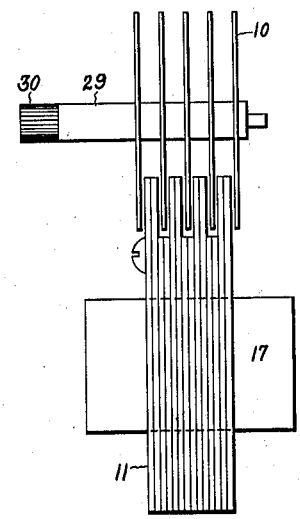

The features of the invention which are believed to be novel and patentable will be pointed out in the claims appended hereto. For a better understanding of my invention, reference is made in the following description to the accompanying drawings, in which various different views and modifications of the invention are illustrated as follows: Fig. 1 illustrates an end view of a preferred form of my invention. In this view both outer legs of the stator are provided with shading coils or secondary windings for lagging the flux therethrough. Either of these coils may be short-circuited so as to reverse the direction of rotation. Fig. 2 shows a side view of the same motor taken at right angles to Fig. 1; Fig. 3 is a speed torque curve which will be referred to in explaining the operation of the motor; Fig. 4 represents a modification where the rotor is off set slightly from the central axis of the stator, providing a little different relation of the air gap fluxes with respect to the rotor; Fig. 5 shows how the number of rotor discs may be multiplied indefinitely to increase the torque of the motor; Fig. 6 shows a motor in which three individual stator field units are arranged to operate upon a common rotor element; Fig. 7 represents a modification wherein the entire periphery of the rotor is utilized by a stator element made up of a plurality of field elements having an integral core structure; and Fig. 8 shows a shaded pole motor having a plain disc rotor without salient poles.

Referring now to Fig. 1, I have represented a simple form of the new motor comprising the rotor 10 and stator 11. The rotor 10 comprises one or more units, each comprising a thin, disc-shaped wheel having spokes 12 and rim 13. This wheel is preferably made of hardened or permanent magnet steel.

The field structure 11 comprises an E-shaped three-legged magnetic core, preferably laminated. The central leg 14 of this core carries a single phase primary exciting coil 17, which supplies the total excitation and input to the motor. The outer legs 15 and 16 have a shading coil or secondary winding on one or both legs, but in case both outer legs are provided with such coils only one coil will be used at a time. In Fig. 1, secondary shading coils 18 and 19 are provided on both legs, and the coil terminals are carried to a three-way switch 20 by means of which one or the other of the secondary coils may be closed upon itself, or in a mid-position of the switch both coils may be open. The advantage of this arrangement will be referred to later. For the present it will be assumed that the secondary or shading coil 18 is closed and 19 is open so that the motor will function as if coil 19 were not present. It will be noted that the laminated core structure comprises a double magnetic circuit which is closed except for the relatively small air gap openings 24 and 25 between the legs at the upper ends adjacent the rotor, where the three legs converge into pole tips 21, 22 and 23. These poles are spaced apart in a circumferential or tangential direction about and adjacent the rotor. Preferably, a few of the laminations opposite the rotor are cut off, forming a slot or recess 26 into which the periphery of the rotor extends, as shown in Fig. 2, so that the rotor rim and a portion of the spoke portion is well submerged in and the rotor periphery is nearly surrounded by the pole tip portions, thus increasing the adjacent surface areas. The angle between the air gaps 24 and 25 is preferably somewhat greater than the angle between two adjacent rotor spokes, so that the spacing of the pole tips 21, 22 and 23 at their outer ends is about the same as that of the rotor spokes at this point, and is somewhat greater at the rim of the rotor, such that the polar arc at the spokes is the same as the spoke spacing, but the polar arc at the rim measured in degrees is slightly greater.

When the winding 17 is excited by alternating current, the alternating flux set up in core 14 divides and returns through the two outer legs, producing poles of opposite polarity at 22 and 23 and at 22 and 21 such that pole tip 22 has opposite polarity at any instant with respect to pole tips 21 and 23. However, due to the presence of the short-circuited secondary winding or shading coil 18, that portion of the flux returning through leg 15 will lag somewhat behind that returning through leg 16. Consequently, there will be a difference in phase of the flux between pole tips 22 and 23 and that between pole tips 22 and 21. It is not necessary or desirable that the secondary flux lagging coil be of exceedingly low resistance, because this would have the effect of undesirably unbalancing the division of the fluxes; nor is it necessary that the flux lag produced by the secondary coil be very great. Thus, the fluxes across the two air gaps are not greatly unbalanced and there is a slight phase difference between the maximum values of these fluxes. There is little stray flux with this field current, and substantially all of the flux in the magnetic circuit is available for action on the permanent magnetic material of the rotor.

The action of these fluxes upon the rotor at starting, as it is now understood, is as follows: The action of the poles of opposite polarity at 22 and 23 is to set up at one instant very strong poles in the rotor rim or non-salient portion of the rotor, and these poles become remanent at points somewhat farther apart than the angular distance apart of the spokes, due to the greater polar arc at the rim. An instant later the pole strength of 22 and 23 diminishes, but there is an increase in pole strength of 22 and 21, the latter being of the same polarity as 23 just previously. Consequently, the pole set up in 21 will tend to repel the remanent pole of the rotor rim established just previously by pole tip 22 and thus drive the rotor in the direction of the unshaded pole 23, the flux of which has now decreased. After the flux from 22 and 21 has reached its maximum value, remanent poles will have been set up in the rotor rim in different locations from those which are set up previously. The next peak of the flux will be reached when poles 22 and 23 are of reversed polarity, and now pole 23 will attract the remanent pole of the rotor rim which had previously been established under 22. Thus, the rotor rim will have a strong driving torque imparted to it, always in the direction from the shaded pole air gap towards the unshaded pole air gap. It will be noted that this is the opposite direction of rotation from the usual shaded pole motor. I find that this starting torque is great and uniform as compared with other forms of synchronous motors of the type which utilize remanent magnetism in the rotor, so that any comparatively strong reaction torque tending to lock the motor at standstill due to the spokes or salient poles may be overcome and the motor has excellent starting characteristics. The foregoing description of the operation relates to the starting, and it will be observed that the starting element of the rotor comprises the rim section.

The maximum rate of rim speed at which a rotor of this type will run will depend upon the rotor angle subtended at the rim by poles 21, 22 and 23 or by the air gaps 24 and 25, because as soon as the remanent poles of the rim pass through such angle at a speed faster than that corresponding to the reversal of the flux, the motor will tend to act as a generator. The air gap relations which I have chosen are such as to be capable of driving the rotor rim up to a speed somewhat greater than the synchronous speed corresponding to the number of rotor spokes or salient poles, assuming the latter were not present. I then depend upon the rotor spokes or salient poles portion of the rotor to hold this speed down to the true synchronous value, so that when the motor is unloaded the rotor spokes may be considered as salient poles cooperating with the flux pulsations to oppose the torque of the rim and hold the motor at synchronous speed. Should the motor be loaded to a point where the rim torque is exceeded by the load, the salient poles will add synchronous torque and resist a rotation lower than the synchronous speed. The rim torque is, of course, less at synchronous speed than at starting, but is made sufficient to bring the load for which the motor is designed up to synchronous speed where the synchronous torque predominates and establishes the operating speed of the rotor. The motor of Fig. 1 is designed for 400 R. P. M. on 60 cycles and has 18 spokes or poles. The synchronous action is such that a spoke passes from pole tip 21 to pole tip 22 in a half cycle, and from pole tip 22 to pole tip 23 in the next half cycle.

The spokes become permanently magnetized with alternate north and south remanent poles. The small phase angle between the fluxes between 21 and 22 and between 22 and 23 is not sufficient to interfere with true synchronous operation, since the pole tips are wide enough to have some portion opposite the adjacent spokes during the maximum portion of the flux pulsation, even though these maximum portions do not occur simultaneously under pole tips 21 and 23.

It may be helpful to an understanding of the motor operation to consider it for the moment as two separate motors, one motor consisting of the rim section of the rotor together with that portion of the stator poles opposite the rim section, and the second motor consisting of the spoke portion of the rotor and that portion of the stator poles opposite thereto, both motors being energized by the same field. The first motor could then be considered as a shaded pole hysteresis motor without salient rotor poles designed for a top speed of S, determined by the polar arc between the pole sections operating on the rim, the amount of flux lag, and the frequency. Owing to the absence of salient rotor poles, this motor has excellent starting torque. During the starting period the remanent poles formed by the unshaded flux pulsation are not in the same positions in the rotor as those formed by the shaded flux pulsation, so that there is a torque producing shifting of the remanent poles until the maximum speed S is reached, when the shifting ceases. If permitted, a weak synchronous speed would be developed if the remanent poles should happen to be properly spaced so as to make an even number evenly spaced about the rotor periphery. The other motor may be considered as a synchronous hysteresis motor with salient rotor poles having no useful torque except at and close to its synchronous speed S', which speed is slightly less than the top speed S of the other motor and is determined by the slightly smaller polar arc between stator poles sections and the corresponding spacing of the salient rotor poles and the frequency. This synchronous speed S' is strong and definite, due to the salient rotor poles, and does not depend upon the flux lag produced by the shading coil.

The difference in the speeds S and S' of the two motors is, therefore, largely determined by the difference in the polar arc of the effective stator pole elements, the polar arc of the synchronous motor being somewhat less than that of the other motor, so that when the two motors are combined the synchronous motor torque comes into effect and predominates at a speed sufficiently below the speed where the starting torque becomes zero that we may be assured of the motor accelerating to the synchronous speed. The relation between these torques at synchronous speed may be altered by varying the polar arc relation opposite the spokes and rim section. The reason for the preferred angular relation of the pole tips as represented in the drawings is thus explained.

The torque of the motor is thus made up of two components, one due to the rim section and the other due to the spoke section. We may illustrate the speed-torque relations as in Fig. 3. Where the portion A of the curve represents the useful starting and accelerating torque of the rim section. B represents the pull in and synchronous torque of the salient pole section, and C represents the nature of the torque of the rim section that would be present if the rotor were allowed to accelerate beyond the synchronous speed point opposite B. The rim torque through portion B and beyond is indicated by a dotted line. Opposite B the rim and spoke torques are added if the load is such as to tend to reduce the speed below this point, but the motor cannot accelerate beyond the synchronous speed because the negative synchronous torque exceeds the positive rim torque. The wave in the rim torque opposite C is due to the tendency to synchronize at a speed where the remanent poles cease to shift.

Another feature about this motor to which I desire to call attention is that there is believed to be a selective distribution of the flux on the two parts of the rotor between starting and running conditions which improves both conditions. At synchronous speed the spokes of the rotor come into low reluctance positions in synchronism with the flux pulsations, which does not happen below synchronous speed. Moreover, when synchronism is established the spokes become polarized to a certain extent, which further decreases the effective reluctance to fluxes between them and the adjacent stator pole tip. Because of this it is believed that a greater amount of the stator flux will pass into the spoke portion of the rotor at synchronous speed than at lower speeds so as to obtain a desired selective distribution of the flux between starting and synchronous conditions which is helpful to both starting and synchronous operation. Thus, at the establishment of synchronous speed, a portion of the flux which during starting acted upon the rim section shifts and now acts upon the spoke section, the magnetic material in the rotor and stator being so disposed with respect to each other as to permit this selectivity to occur as the effective reluctance relationship of the different portions varies between starting and running conditions.

It will be evident that by reversing the switch 20 so as to open secondary lag coil 18 and close secondary lag coil 19, the motor may be reversed. If the active secondary lag or shading coil is opened when the field coil 17 is energized, the motor stops substantially instantaneously, since the driving torque of the rim section ceases and is replaced by an effective damping torque. The motor is exceedingly quick in starting and stopping and accurate in its movement, and may be used as a position signaling device controlled by the switch 20 with the primary field energized continuously.

The motor bearing shown in Fig. 2 comprises a stationary pin 27 supported from the motor field structure by member 28 and extending into a recessed hub member 29 which supports the rotor 10 and integral pinion gear 30. The pin 27 has a recessed end which rests against a steel ball 31. The hub comprises a container which is filled with a lubricant and may be made of transparent material, such as celluloid, to facilitate filling and inspection. A hollow bushing or plug 32 through which pin 27 passes closes the end of the lubricating container and forms a guide bearing for the pin at its inner end. The outer end of the bushing has its opening enlarged so as to form an overflow chamber for lubricant and in which lubricant is retained by capillary action. Thus, expansion and contraction of the lubricant due to temperature changes merely changes the amount of lubricant in the overflow chamber, which is not lost, nor is air permitted to replace lubricant in the main container. Where necessary, a stop 33 may be used to prevent the bearing moving endwise off the pin 27. This bearing is described and claimed in my co-pending application Serial No. 569,607, filed concurrently herewith.

In Fig. 4, I have shown the motor of my invention with a somewhat different air gap relationship. Here the rotor axis is slightly offset from the center line of the stator such that the rotor spokes cut somewhat diagonally across the air gap between the stator pole pieces. With this arrangement the synchronous operation appears to involve sections of the spoke only, and not the entire spokes as in Fig. 1. The pole piece sections are shaped to obtain the best results. Otherwise the motor operates as that of Fig. 1. Where reversing operation is not required, the secondary or shading coil may be a closed conductor, as represented at 34. In case the motor is provided with a permanently short-circuited secondary or shading coil 34, I may make the air gap relations at the upper end of the shaded leg slightly less than those at the upper end of the other outer leg and thus compensate for the slight unbalance of the fluxes through the two outer legs that is due to the added reluctance of the shaded leg due to the shading coil 34. In this way the fluxes through the two legs may be exactly balanced although the phase difference will be present. I have not found it necessary to resort to this expedient, but there may be instances where such compensation will be desirable.

Fig. 5 is a side view of a motor of my invention where a plurality of rotor elements 10 are employed loosely dovetailed in interleaving relation with the stator laminations. It will be evident that any number of rotor elements may be thus used, increasing the torque of the motor accordingly. It is not essential that all of the rotor elements be alike. For example, I may vary the depth of the rim sections, or I may use plain discs for some of the sections and salient pole elements for other sections, and then proportion the starting and synchronizing characteristics as desired. It will be evident that a plurality of rotor elements can be used with any of the stator elements described.

In Fig. 6, I have represented a more powerful form of motor built in accordance with my invention where three stator field elements substantially like that of Fig. 1 are grouped about the same rotor. The proper relation of phase, polarity and spacing of the three stator elements should be made such that the same synchronous relation exists between the rotor poles at the three stator elements. Thus, a spoke having a remanent north pole should rotate in synchronism with fluxes of corresponding polarity at all three stator elements at the synchronous speed. Thus, if the three stator elements were excited from the three phases of a three phase supply, the spacing would vary from an even rotor pole number by the equivalent of 120 electrical degrees. If the stators were excited from the same single phase source and were of the same polarity, their spacing would be an even number of rotor poles apart, such as represented in Fig. 6.

In Fig. 7, I have shown a still more powerful form of motor in accordance with my invention. Here the stator comprises a circular outer section 36 with a plurality of groups of inwardly projecting pole pieces such as groups 37 and 38. Each group is the equivalent of one stator element such as shown in Fig. 1, and has the central leg with its primary winding and the two outer legs, one of which is provided with a shading coil 34. Each element or group acts simultaneously but individually upon the common rotor. The rotor shown is for 36 poles, and its synchronous speed on a 60 cycle circuit will be 200 R. P. M. The spacing between different stator elements represented requires all primary coils to be excited from the same single phase source and to have the same polarity at any instant.

Experiments which I have made with the new form of motor indicate that the exact location of the rotor with respect to the field is not very critical and that quite a variation can be made without interfering with successful operation. The motor will start and operate satisfactorily over a wide voltage and frequency range. For example, a motor designed for 110 volts 60 cycles will operate satisfactorily over a range of frequency from 25 to 120 cycles, and its voltage may be varied 100% or more without interfering with self-starting and synchronous operation. The torque of the motor such as is shown in Fig. 1 with a single rotor element .01 inch thick made of hardened tungsten steel about one inch outside diameter with 18 poles and used in a single stator field element, is about 1 millimeter grams at 400 R. P. M., which is more than ample for all ordinary clock movements. The motor is substantially noiseless in operation; there is no troublesome external flux from the field; the structure is exceedingly low in cost; the electrical energy required for operation is about the same as that necessary for the best of present day synchronous clock motors. The motor will start from rest and reach synchronous speed almost instantaneously, and when provided with a shading coil that may be controlled as in Fig. 1, the motor may be used as an accurate timing device for races, etc., since it may also be stopped substantially instantaneously by opening the shaded coil circuit. The motor is less costly and smaller than existing motors capable of giving the same performance.

Various modifications of the motor will occur to those skilled in the art after becoming acquainted with the disclosure hereof. For example, if we omit the salient pole or spoke portion of the rotor, as, for example, by using a plain steel disc as indicated in Fig. 8, we will obtain a good motor for certain purposes where strict synchronous operation is not essential, having the peculiarity of rotating in the opposite direction from that which is usual in shaded pole motors. If we omit the rim portion of the rotor we may obtain a non-self-starting synchronous motor which will operate if brought up to synchronous speed by an external agency. I do not wish to confine my invention to any particular way of obtaining the out-of-phase stator fluxes. The single primary winding and the short circuited secondary winding illustrated and described are preferable to polyphase windings in various small motors, to which the invention is particularly applicable, because simpler, less expensive, and may be used when only a single phase source of supply is available, and certain of the appended claims are limited to this preferred arrangement. Such other modifications and combinations of the modifications already described as will occur to those skilled in the art and which do not depart from the true spirit and scope of the invention are intended to be included within the scope of the appended claims.

What I claim as new and desire to secure by Letters Patent of the United States, is:

1. An alternating current motor comprising cooperating stator and rotor members, the rotor member having a non-salient pole magnetic portion and a salient pole magnetic portion, the stator having a three-legged field element with pole pieces positioned to simultaneously produce fluxes in both portions of the rotor and spaced apart in a circumferential direction about the rotor, means for energizing said field to produce alternating fluxes of the same polarity in the outer pole pieces and a flux of the opposite polarity in the middle pole piece at any instant, and means for causing the flux in one outer leg to lag behind that in the other outer leg.

2. An alternating current motor comprising cooperating stator and rotor elements, the stator having a field element with three pole pieces spaced about the rotor in a circumfertial direction, means for energizing said field element so as to produce an alternating flux of one polarity in the middle pole piece and fluxes of opposite polarity in the outer pole pieces at any instant, means for causing the flux in one of the outer pole pieces to lag behind that in the other outer pole piece, the rotor element having a portion acted upon by said fluxes to produce starting torque and a salient pole piece magnetic portion acted upon by said fluxes to produce a predominating synchronous torque at a speed to which the rotor will accelerate due to the starting torque.

3. An alternating current motor comprising cooperating stator and rotor members, the rotor member having a disc-shaped secondary member with an outer rim section and a salient magnetic pole inner spoke section, the stator having a three-pole piece field element energized by a single primary coil, with the three pole pieces embracing the rim section and a portion of the spoke section of the rotor and spaced apart in a circumferential direction about the rotor, the center pole piece being of opposite polarity to the outer pole pieces at any instant, and means for causing the flux in one of the outer pole pieces to lag behind the flux in the other outer pole piece.

4. An alternating current motor comprising cooperating stator and rotor elements, the rotor having a magnetic portion without salient poles for starting purposes and a salient pole piece magnetic portion for synchronous operation, the stator having a three-pole piece field element with the three pole pieces positioned about the rotor in a circumferential direction, means for energizing said field element from a single phase source so as to produce alternating fluxes of one polarity in the outer pole pieces and a flux of the opposite polarity in the central pole piece at any instant, said pole pieces being so positioned with respect to the two portions of the rotor that the effective polar arc for the salient pole piece portion corresponds to the spacing of the salient poles thereof and is less than the effective polar arc for the other rotor portion, and means for causing the flux in one outer stator pole piece to lag behind that in the other outer stator pole piece.

5. An alternating current motor having coöperating stator and rotor elements, the rotor element comprising a disc-shaped magnetic member of hardened steel with an outer rim portion and a salient pole spoke portion supporting the rim, the stator member having a group of three poles spaced about the rotor in a circumferential direction, and having portions extending adjacent both rotor portions, the spacing of the stator pole pieces adjacent the spoke portion of the rotor corresponding substantially to the spacing of the spokes, and the stator pole pieces adjacent the rim portion of the rotor being spaced apart a greater arc distance measured in degrees than the angle between adjacent spokes, means for energizing said field element to produce alternating fluxes of the same polarity at the outer pole pieces and of the opposite polarity at the middle pole piece thereof at any instant, and means for causing the flux in one outer pole piece to lag behind the flux in the other outer pole piece.

6. An alternating current motor comprising coöperating stator and rotor elements, the rotor element having a disc-shaped rotor of permanent magnetic material with a non-salient pole rim portion and a salient pole spoke portion supporting the rim, the stator having a field element consisting of a magnetic core member with three projecting limbs, the extremities of which form pole pieces spaced about the rotor in a circumferential direction, said pole pieces having circumferential recesses in their faces embracing the rim and a portion of the spoke portion of the rotor, the effective spacing between the pole pieces adjacent the spoke portion of the rotor being approximately equal to the spacing of the spokes, and the effective angular spacing between the pole pieces adjacent the rim section of the rotor being greater than the angle between adjacent spokes, a single phase energizing winding on the central limb of said core member and a shading coil on one of the outer limbs of said core.

7. An alternating current motor comprising a stator having a field element consisting of an E-shaped core with a single phase energizing winding on the middle leg and a shading coil on one of the outer legs, and a rotor rotatively mounted adjacent the open end of said E-shaped core so as to be influenced by the fluxes passing between the open ends of the legs thereof, the legs being spaced about the rotor in a circumferential direction, said rotor having a non-salient pole magnetic portion which is acted upon by the stator fluxes to produce a torque in the direction from the shaded limb towards the other limbs of the core.

8. An alternating current motor comprising a stator and rotor, the latter having a non-salient pole portion of magnet steel, the stator having a field element consisting of a group of three pole pieces spaced apart in a circumferential direction about the rotor, with means for producing alternating fluxes of the same polarity in the outer pole pieces and of the opposite polarity in the central pole piece at any instant, and means for causing the flux in one outer pole piece to lag behind that in the other outer pole piece, said fluxes acting upon the rotor portion to produce a torque in a direction opposite to the direction of flux lag.

9. An alternating current synchronous motor comprising stator and rotor elements, the rotor having a salient pole portion of magnet steel, the stator having a field element consisting of three pole pieces spaced apart in a circumferential direction adjacent the rotor approximately at the same angular spacing as the salient poles of the rotor portion which are adjacent thereto, with means for producing alternating fluxes between the center and outer two poles, the outer poles serving as parallel return paths for the flux of the central pole.

10. A self-starting synchronous reversible alternating current motor comprising stator and rotor elements, the rotor having non-salient and salient pole portions of magnet steel, the stator member having a field element with three salient pole pieces spaced apart in a circumferential direction about the rotor so as to influence both rotor portions, a single phase primary winding for producing alternating fluxes of one polarity in the outer pole pieces and of the opposite polarity in the central pole piece at any instant, secondary windings surrounding the outer pole pieces, and a three-way switch connected to said secondary windings so as to alternately short circuit either secondary winding or to open both secondary windings.

11. A self-starting synchronous reversible alternating current motor of the hysteresis type, comprising stator and rotor elements, the rotor having a disc-shaped member of magnet steel having an outer rim section and an inner spoke section supporting the rim section, the stator having a three-pole piece field element with the pole pieces spaced apart in a circumferential direction about the rotor so as to influence both sections of the rotor, means for energizing said field element to produce alternating fluxes of one polarity in the outer pole pieces and a flux of the opposite polarity in the central pole piece at any instant, starting, stopping, and reversing control means for said motor comprising means for controlling the presence and direction of flux lag between the two outer pole pieces.

12. An alternating current motor comprising stator and rotor members, the rotor having non-salient and salient pole portions of magnet steel the stator having a field element with three pole pieces spaced apart in a circumferential direction about the rotor, with parts adjacent each portion of the rotor, the parts adjacent the salient pole rotor portion being spaced approximately the same as the salient poles of such portion, means for producing alternating fluxes of one polarity in the outer pole pieces of the stator field element and of the opposite polarity in the central field element thereof at any instant, means for causing the flux in one outer pole piece to lag behind that in the other outer pole piece, the fluxes thus produced acting upon the non-salient pole portion of the rotor to produce a starting torque, and upon the salient pole portion of the rotor to produce a synchronous torque at a speed where a salient pole of the rotor moves from one stator pole to the next in each half cycle of the flux wave, the extent of flux lag being insufficient to interfere with synchronous operation.

13. An alternating current motor comprising stator and rotor elements, the rotor having a plurality of disc-shaped members of magnet steel spaced from each other along the axis of rotation, the stator having a field element with salient poles spaced apart in a circumferential direction about the rotor, means for producing alternating fluxes between said poles, said pole pieces having recesses in alignment with rotor disc members and into which the aligned rotor members extend in an interleaving relation so as to provide a large surface area between adjacent stator and rotor parts.

14. A self-starting synchronous alternating current motor comprising stator and rotor elements, the rotor having non-salient and salient pole portions of magnet steel, the stator having a plurality of field elements, each consisting of a group of three salient pole pieces spaced apart in a circumferential direction about the rotor, together with means for producing alternating fluxes of the same polarity in the outer pole pieces of a group and of the opposite polarity in the central pole piece of a group at any instant, and secondary lag on corresponding outer pole pieces of the different groups, the different groups being spaced about the rotor and so energized from a common source of supply that these fluxes produce similar action on the salient pole portions of the rotor as such poles rotate past the different groups in succession at synchronous speed.

15. An alternating current motor, a thin disc-shaped rotor of permanent magnet material, a field structure having a three legged core structure, the outer ends of the legs forming pole pieces partially surrounding the rim of the rotor and spaced from each other in a circumferential direction by narrow air gap, means for producing alternating fluxes in parallel from the middle leg to the two outer legs across said air gap, the latter sharply defining the field of flux such that remanent magnetic poles are induced in and near the rim of the rotor beneath the three field pole pieces, and means for producing a lag in the flux across one air gap relative to that across the other air gap.

In witness whereof, I have hereunto set my hand.

HENRY E. WARREN.